United States Patent [19]

Range et al.

[11] 4,120,202

[45] Oct. 17, 1978

[54] POSITIVE DISPLACEMENT PUMP

[75] Inventors: Richard J. Range; Charles I. Soodak, both of Silver Spring, Md.

[73] Assignee: Baxter Travenol Laboratories, Inc., Deerfield, Ill.

[21] Appl. No.: 777,597

[22] Filed: Mar. 15, 1977

[51] Int. Cl.$^2$ ............................................ G01N 1/14

[52] U.S. Cl. .................................. 73/421 R; 222/309

[58] Field of Search ......................... 73/425.6, 425.4 P; 222/309; 92/13.4

[56] References Cited

U.S. PATENT DOCUMENTS 3,495,742 2/1970 Hdamik ................................ 222/309

3,572,130 3/1971 Goldsmith .......................... 73/425.6

*Primary Examiner*—S. Clement Swisher

*Attorney, Agent, or Firm*—Henry W. Collins; Richard G. Kinney; James T. FitzGibbon

[57] ABSTRACT

A variable volume, positive displacement pump apparatus for withdrawing samples of liquid from a reservoir and discharging them into a sample analyzer. In the preferred form of pump, two syringe assemblies are provided, each one having a movable plunger assembly and a valve unit associated therewith. The plunger assemblies are reciprocated by engagement thereof by a motor driven, reciprocable carriage assembly which includes a cross member for pushing selected metering rods upwardly against the plungers. The carriage also includes a pair of yokes to engage the plungers and pull them downwardly to aspirate the specimens. Valve movement is achieved by a gear drive which moves the valve between one position which enables the syringe to be filled and another position enabling the syringe contents to be discharged. The volume displaced with each stroke is determined by the length of the metering rod inserted between the carriage and the syringe plunger. Selection of a desired length of metering rod is achieved by rotating a turntable containing plural rods so as to index a given rod of selected length into a position of engagement between the carriage and the plunger. This enables rapid and highly accurate digital selection of pump volume to be made and provides the pump with outstanding accuracy. Appropriate lost motion is provided in the mechanism so that, although the carriage operates continuously, the syringes are not moved during the time the valves are being positioned and vice versa.

14 Claims, 6 Drawing Figures

POSITIVE DISPLACEMENT PUMP

BACKGROUND OF THE INVENTION

The present invention relates generally to liquid pumps, and more particularly to liquid pumps for precisely selecting the volume of reagent to be pumped from a supply or storage vessel to another container for reaction or analysis. While the pump of the invention has other uses, one important use thereof is in pumping precisely determined volumes of specimens, diluents, and laboratory reagents, or other chemicals to be used therewith into the reaction vessels contained in instrumental analysis machines.

In laboratory analysis, including analysis of blood or other serums, it is now common to use highly sophisticated electronic equipment which analyzes specimens, before, during, or after they undergo a chemical reaction. Analysis is often carried out by projecting light beams through a container of the sample in question and measuring a physical characteristic such as absorption of a characteristic light frequency band, light scattering, or other physical phenomenon.

Modern machines are capable of analyzing a larger number of specimens in a relatively short time with a high degree of accuracy. However, the accuracy potential of the analysis instrument cannot be achieved unless the characteristics of the specimen are determined with an equal order of accuracy. In many laboratory analysis situations, a weak link in analysis process, from a functional standpoint, has been failure to exercise consistently close control over the volumes of samples or specimens, the volume of the reagent and/or the volume of the diluent used in preparing the sample for analysis. It is always quite possible, of course, to achieve high accuracy and repeatability in laboratory measurements, provided that sufficient time and care is taken in manipulating hand-operated measuring devices. By way of example, accurate liquid volume measurements may be obtained by the use of piettes or the like; however, using devices of this sort is time consuming, and, of course, subject to some degree of human error.

In an effort to provide liquid pumps which would enable advantage to be taken of the speed and accuracy potential of modern fast analyzers, prior art pumps have been made which are, at least to a certain extent, successful in providing convenient, variable volume settings. However, such pumps are still capable of further improvement. For example, pumps are known in which the stroke length, and hence volume of liquid, can be varied, and in some such pumps an adjusting screw or micrometer screw is used to determine the different stroke lengths desired. However, a micrometer screw which has a sufficiently fine pitch to be highly accurate requires a large number of turns to be high and low volume pumping positions. Any errors made in making the screw thread tend to become cumulative. Fine pitch, accurate threads are expensive and, where an adjusting wheel is used with the threads, it is sometimes not possible to arrange the wheel so that it can be readily viewed from a convenient position in all volume settings.

Moreover, in pumps of this type, it is not uncommon for the pump to require "zeroing in" every time a significant adjustment is made for changing the length of the stroke.

In view of the shortcomings of prior art pumps of the general type referred to above, it is an object of the present invention to provide an improved positive displacement liquid pump.

A further object is to provide an improved liquid pump which includes a plurality of individual links or metering rods governing the effective pump stroke length, and which includes means for indexing a selected link into a position of use in a simple and accurate manner.

Another object is to provide a pump which includes a plurality of such rods constructed and arranged within a turret or turntable so as to facilitate easy selection by the operator.

A still further object is to provide a pump in which the operator may rapidly choose among various operative positions in which a small, large or moderate volume is to be pumped, and may immediately position the rods so as to obtain the desired position.

Yet another object is to provide a variable volume pump assembly in which the volume selected may be read clearly and unambiguously, without requiring interpolation or reading of the intended volume from a Vernier scale or the like.

Another object is to provide a pump in which the functional elements include readily available syringes, and in which the syringes may be easily inserted and readily removed for replacement.

An additional object is to provide a pump characterized by sinusoidal motion of the means driving the plunger, thereby reducing or eliminating sudden changes of plunger movement.

A still further object is to provide a pump which is easy to set up and calibrate, and which is highly reliable in use.

Yet aother object is to provide a fluid pump which, in use, will manipulate the valves controlling fluid flow into and out of the syringes, and which will insure accurate and repeatable positioning of the valves as well as insure that the syringe plungers are not moving during the time the valve positions are being changed.

A still further object is to provide a pump unit having a reciprocable power driven carriage with upper and lower drive members thereon, at least one pump unit including a cylinder and a reciprocable plunger, and at least one turntable including a plurality of metering rods received therein and mounted for free but limited reciprocable movement, with the lower drive member of the carriage being adapted to engage a lower portion of a selected metering rod when the rod is received between the lower member and a portion of the plunger, and the upper drive member having portions overlying a lower portion of the plunger, whereby carriage reciprocation causes the metering rod to engage a portion of the pump on the upward stroke and the upper drive member pulls the plunger downwardly on the down stroke thereby discharging and filling the pump cylinders with each reciprocation of the carriage.

Another object is to provide a pump which includes a valve mechanism associated with a pump cylinder and plunger and adapted to move between a first position permitting the cylinder to be filled from a supply source and a second position permitting the contents of the cylinder to be discharged through an outlet passage, with the pump also including means for moving the valve between such positions when the pump mechanism is temporarily at rest following respective filling and emptying of the pump cylinder.

Another object is to provide a positive displacement pump in which a pair of pump cylinders and plunger assemblies are included, with each assembly including its own associated turntable and a plurality of metering rods of varying length received therein, with both of the plungers being adapted for actuation by a single power driven reciprocable carriage.

A still further object is to provide a multiple cylinder, positive displacement pump having a pair of cylinders and reciprocable plungers, a valve associated with each cylinder and movable between first and second positions permitting respective filling and discharge of the contents of said cylinders, an operative drive connection between the means for reciprocating the plungers and the means for positioning the valves, with the valve positioning means being adapted for movement only during those portions of the movement cycle during which movement of said plungers does not occur.

These and other objects and advantages of the invention are carried into practice by providing a pump which includes at least one fluid cylinder, such as a syringe or the like, a valve mechanism for controlling filling and evacuation thereof, a reciprocable plunger for filling and emptying the cylinder, means for reciprocating the plunger under power, and a plurality of metering rods of varying lengths which are selectively positionable between portions of the drive mechanism and the plunger, and in a preferred form of the pump, means for permitting lost motion between the means for reciprocating the plunger and the metering rods so as to permit the plunger to be free from driven movement during the time the valve mechanism is being moved between various operative positions.

The exact manner in which the foregoing and other objects and advantages of the invention are achieved in practice will be more clearly understood when reference is made to the following detailed description of the preferred embodiments of the invention set forth by way of example and shown in the accompanying drawings in which like reference numbers represent corresponding parts throughout.

DESCRIPTION OF THE PREFERRED EMBODIMENTS OF THE INVENTION

Whereas the pump assembly of the present invention may incorporate one or more piston and cylinder assemblies, or syringes including plungers, and may be used in various positions, a preferred embodiment of the pump assembly will be described which includes a single reciprocable carriage and a carriage drive, in which a pair of valve-controlled syringes are provided and are arranged for filling by downward movement of the plunger and for discharge by upward movement thereof, in which a plurality of metering rods are disposed in each of a pair of rotary turrets arranged so that a selected rod may be moved to a position of registry between a portion of the carriage and the lower surface of the syringe plunger gripping flange. In the preferred form of pump, the pump carriage includes a cross member which engages the metering rod and the upper surface of the gripping flange on the syringe plunger is engaged on the downstroke by a yoke or the like carried on the upper part of the carriage. The carriage drive also moves the valves in a predetermined sequence to initiate aspiration and discharge of the liquid.

Figure 1:
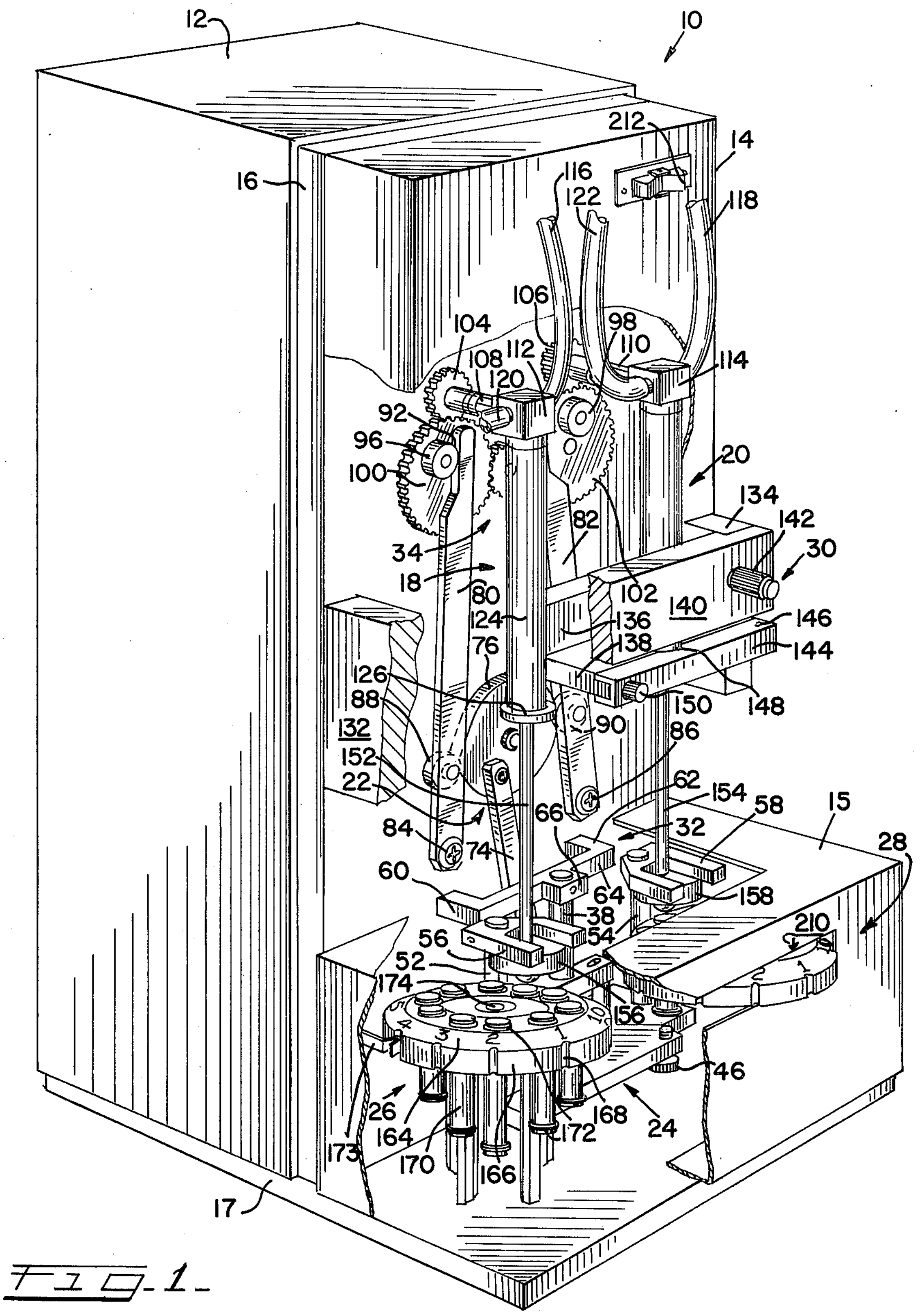
FIG. 1 is a perspective view, with portions broken away, of a preferred form of the invention and showing a pump having two syringes and two volume control assemblies.

Referring now to the drawings in greater detail, FIG. 1 shows the invention to be embodied in a variable volume, positive displacement pump assembly generally designated 10 and including a rear housing or cabinet 12, upper and lower front cabinets 14, 15, and shows that the cabinets 12, 14, and 15 are secured to a vertically extending wall 16 which forms a part of the pump frame generally designated 17.

FIG. 1 also shows the pump 10 to include left and right hand cylinders or syringes generally designated 18, 20, a main operating drive 22, a reciprocable pump drive carriage 24, a left hand and a right hand metering rod turrets 26, 28, and a lower holder assembly 30 for the lower part of the syringes 18, 20, and a carriage guide assembly 32 adapted to insure vertical movement of the carriage 24.

FIG. 1 shows that, in addition to being adapted to drive the carriage 24, the drive assembly 22 also includes components comprising a valve drive train generally designated 34.

According to the invention, both syringe assemblies 18 and 20 serve to draw or aspirate fluids from containers associated respectively with each syringe assembly, and to discharge the fluids through suitable lines into cuvettes or like receptacles forming a part of the fluid analyzer with which the pump 10 is associated in use. Inasmuch as the supply and receiving chambers are conventional and form no part of the invention, and are not novel per se, a detailed description thereof is not necessary to understanding the invention and will be omitted.

Figure 2:
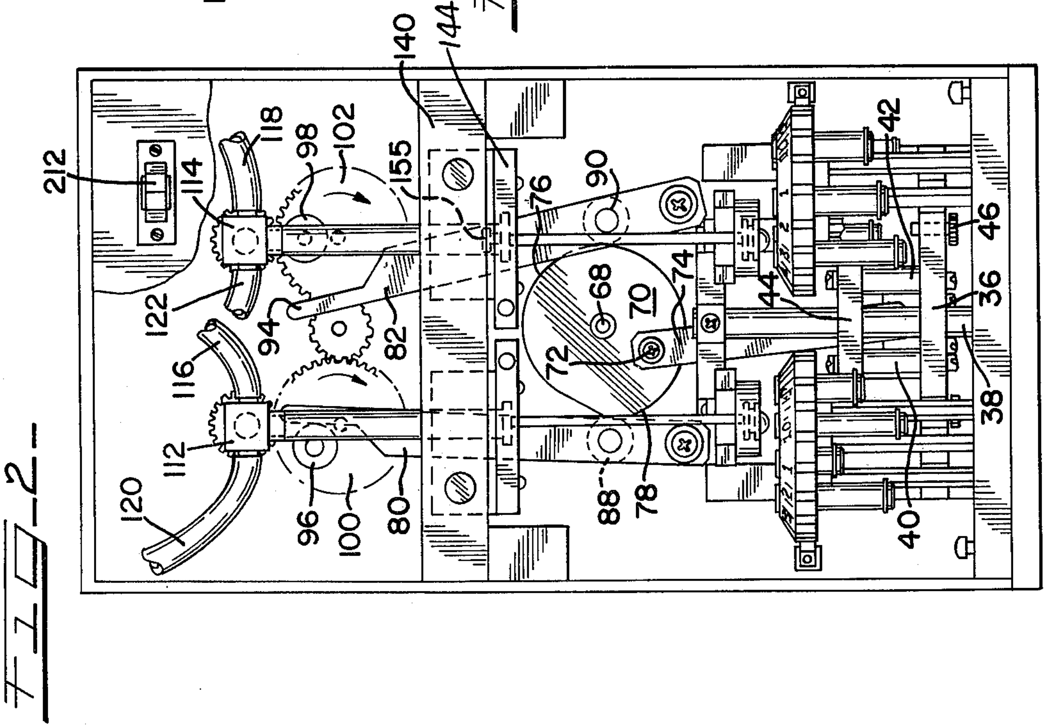
FIG. 2 is a front elevational view of the pump of the invention, with portions of the front cabinets broken away, showing the principal elements thereof.
Figure 5:
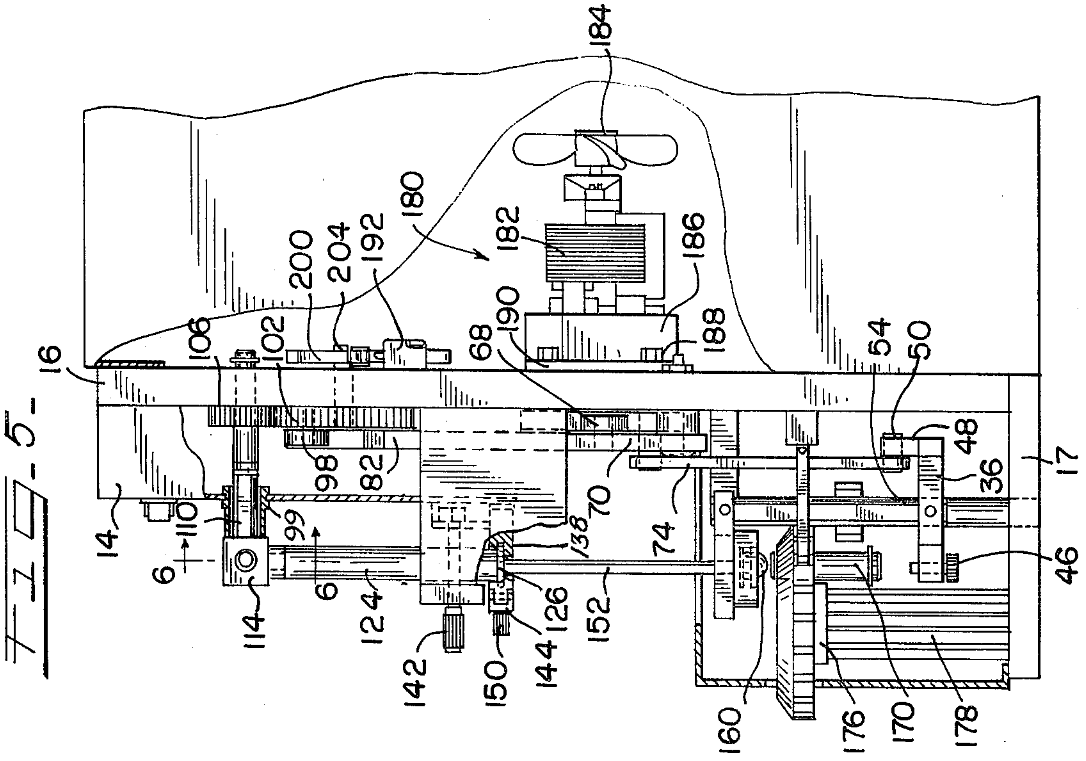
FIG. 5 is a side elevational view, with portions broken away, showing the pump in a particular position of use.

Referring again to the drawings, FIGS. 1, 2 and 5 show that in the preferred form of pump, the syringe holder 30, the operating drive assembly 22, and part of the carriage guide 32, as well as the valve drive train 34 are secured to the vertically extending wall 16, and that the turrets or turntable assemblies 26, 28 and the cylindrical guide rod 38 of the carriage guide 32 are secured with respect to the horizontally extending base or frame member 17.

Referring now to the construction of the carriage assembly 24, this unit is shown (FIG. 2) to include a lower cross member 36, left and right vertical carriage studs 40, 42, an intermediate, guide-receiving cross member 44 extending between the studs 40, 42, and a central opening in registry with the guide rod 38. The lower cross member 36 includes a pair of zeroing screws 46, and a mounting ear 48 which receives a connecting rod wrist pin 50 extending therethrough and forwardly thereof. The carriage guide 32 includes offsetting legs 60, 62 attached to the frame 16, and a cross bar 64 extending between the legs 60, 62. A mounting ear 66 extends forwardly from the cross bar 64 and includes a central opening therein for snugly receiving the upper end portion of guide rod 38.

The carriage assembly 24 also includes a pair of left and right hand yoke supports 52, 54 which are affixed to and extend upwardly from the lower cross member 36. A pair of bifurcated yoke members 56, 58 extend forwardly from the holders 52, 54, for engaging the drive flanges on the syringe plungers, as will be explained more fully herein.

From the foregoing, it will be understood that, in use, the carriage assembly 24 reciprocates vertically, guided by engagement between the lower cross member 36, and the intermediate cross member 44 with the guide rod 38. The plunger-engaging yokes 56, 58 remain spaced apart from the lower cross member 36 and will move synchronously therewith, as will appear.

Referring now to the carriage-operating portion of the operating drive assembly 22, it will be noted in FIG. 2 that an axle assembly generally designated 68 is provided to mount a main drive wheel 70, and that a bearing 72 is mounted on the wheel 70 so as to form a crank assembly. A connecting rod 74 is journaled over the bearing 72 at one end thereof and the other end thereof is journaled by the wrist pin 50 to the mounting ear 48 on the lower cross member 36 of the carriage 24. Consequently, rotation of the main drive wheel 70 causes vertical reciprocation of the carriage assembly 24.

Referring now to the main drive wheel 70, it will be noted that the radially outer surface 76 thereof includes a single cam lobe 78, which describes an eccentric pattern as the drive wheel 70 rotates about the axis defined by the axle 68.

Figure 6:
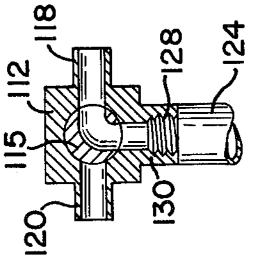
FIG. 6 is a vertical sectional view, on an enlarged scale, taken along lines 6—6 of FIG. 5, and showing the construction of one of the valve units and showing attachment of a portion of the syringe thereto.

Referring now to the other aspect of the operating drive assembly 22, this assembly is shown in FIG. 1 to include a valve drive train which comprises left and right hand valve drive links 80, 82 the lower ends of which are journaled respectively by bearing assemblies 84, 86 to permit oscillation of the upper ends of the links 80, 82. Disposed on the links 80, 82 and spaced upwardly from the bearings 84, 86 are a pair of roller cam followers 88, 90, which cause oscillation of the rods as determined by the profile of the cam lobe 78. The upper ends of the drive links 80, 82 include reduced thickness, follower-engaging fingers 92, 94. Each of these fingers in turn engages a drive roller 96, 98, which is rotatably journaled respectively on syringe valve drive gears 100, 102. The valve drive gears 100, 102, which are rotatably mounted on the vertical wall 16, drivingly engage a pair of drive valve gears 104, 106 which are likewise journaled for rotation about their centers by mounting elements 99 which are attached to the cabinet 14 and thus the frame wall 16. As shown in FIG. 5 valve stems 108, 110 extend from the center of the drive gears 104, 106 respectively, through the mountings 99 and into the valve bodies 112, 114. Respective left and right hand inlet hoses 116, 118 and outlet hoses 120, 122 are connected in fluid-tight relation to the valve bodies 112, 114. FIG. 6 illustrates a cross-section of one such valve body 112 and related components.

As will be recited in further detail elsewhere, it will be seen that, as the pump operates, rotation of the main drive wheel 70 will also cause oscillating movement of the links 80, 82 which in turn will rotate the valve drive gears, causing the valve driven gears and valves stems associated therewith to be rotated in a sequence determined by the arrangement of the lobe 78 on the drive wheel 70.

Referring now to another principal component of the invention, namely, the syringe assemblies, it will be noted in FIG. 1 that the left hand syringe assembly 18 includes a cylindrical body 124 having a radially outwardly extending body flange 126, and an upper end portion, which is threaded as at 128 (FIG. 6) so as to be received within a downwardly extending, threaded nose portion 130 of the valve body 112. Consequently, the syringe body 124 is held snugly at the top thereof by reason of engagement with the valve body 112 which is secured to the cabinet 14 and the frame 16. The lower part of the syringe is secured by engagement between the syringe body flange 126 and those portions of the lower syringe holder assembly 30 which will now be described. The lower syringe holder assembly 30 includes a pair of braces 132, 134 mounted to and extending horizontally outwardly and forwardly from the vertical frame wall 16. A cross member 136 is spaced from the vertical wall 16 and extends between the outer ends of braces 132, 134. Extending outwardly from the cross member 136 is a lower holder plate 138 containing a pair of notches (shown in phantom lines in FIG. 5) adapted to receive the lower syringe body 124 and to engage the bottom flange 126 thereon.

A face plate 140 also extends between braces 132, 134 and includes a pair of thumb screws 142 adapted to secure it in place. Covering the holder plate 138 are identical right and left hand syringe clamps 144. Each clamp 144 is mounted, as by a pivot pin 146, so as to swing outwardly from the holder plate 138 and thus expose the syringe-receiving notch therein. The syringe clamp 144 is preferably notched, as shown generally at 148 in FIG. 1, to permit registry with the lower portion of the syringe and to insure snug reception of the flange 126 thereof by the clamp 144. Each clamp 144 is retained in the closed position by the provision of a clamp thumb screw 150.

From the foregoing, it will be appreciated that, when it is desired to remove the syringe body, the face plate 140 may be removed, and one or both syringe clamps 144 may be released and opened. Either syringe may be unscrewed from the valve body and removed. For replacement, a syringe is placed in the desired position, and the nose portion 128 thereof is screwed into the valve body 112. Next, the lower portion of the syringe is then locked in place by the clamp 144. This strongly anchors the syringe body and prevents undesired movement thereof during use.

Figure 4:
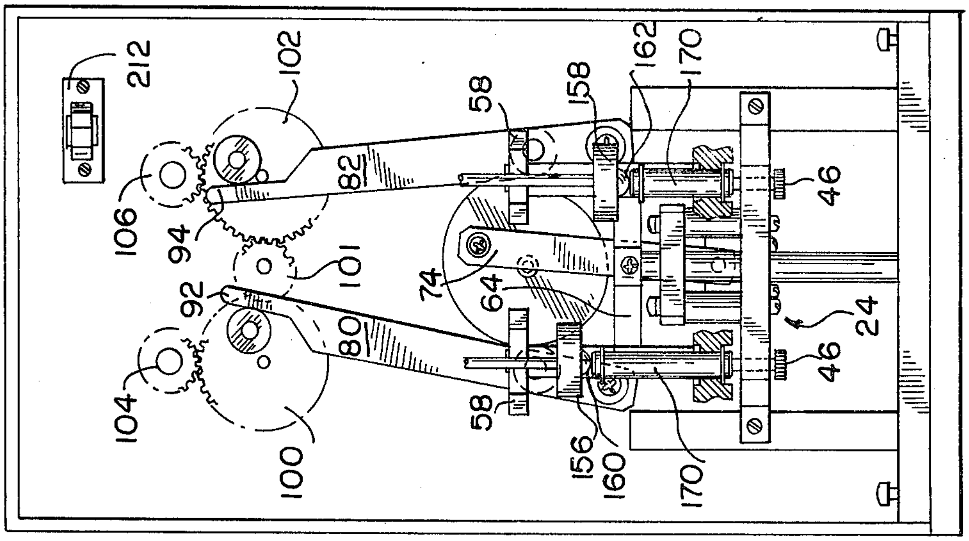
FIG. 4 is a front elevational view, showing principal portions of the carriage and illustrating the operation of the metering rods which provide the stroke length adjustment feature, showing the turrets with portions broken away.

Referring now to another portion of the syringe assembly, it will be noted that each syringe includes a plunger and stem unit 152, 154, and that a stem flange 156, 158 is provided at the bottom of each stem 152, 154. As best shown in FIGS. 4 and 5, each of the flanges 156, 158 may include a rounded boss 160, 162 on the lower surface thereof to eliminate problems of out-of-parallel engagement between the stem flanges on the syringe and the metering rods to be described herein.

When the flanges 156, 158 on the stems 152, 154 are in position of use as shown in FIGS. 1 and 2, the upper surfaces of the flanges can be engaged by the lower surfaces of the syringe yokes 56, 58, and therefore, downward yoke movement will create downward movement of the plunger portions of the syringes 18, 20.

Referring now to another principal component of the pump assembly 10, FIGS. 1, 2 and 5 show a pair of turret assemblies 26, 28 to be mounted for rotation in a horizontal plane, with each turret being associated with its own syringe. Inasmuch as these assemblies are identical except for their positioning within the apparatus, only one such unit will be described in detail. Referring now to FIGS. 1, 2 and 5, it will be seen that a typical turret 26 includes a round turntable portion 164, and a radial outer margin 166 in which a plurality of notches or detents 168 are formed. Numerical or other indicia are provided adjacent each of the notches to inform the user as to the operative position of the turntable.

Radially inwardly of the indicia on the upper surface of the turntable 64 are a plurality of openings, through each of which extends a metering rod 170 of a predetermined length. All the rods 170 are of different lengths, but each includes a snap ring 172 at its upper and lower extremes, and all of the metering rods 170 are mounted for free movement, within the limits imposed by the snap rings, along their respective axes, that is, in the form shown, for vertical movement. The turntable 164 is mounted, as by bearing assembly 174, so as to rotate about a support until 176 which is held in a spaced apart relation from the base 17 of the pump assembly 10 by a plurality of locating studs 178. A spring loaded finger 173 is adapted to engage each of the detents 168 so as to locate the turntable 164 in a precise position of rotary registry, for purposes which will appear.

Figure 3:
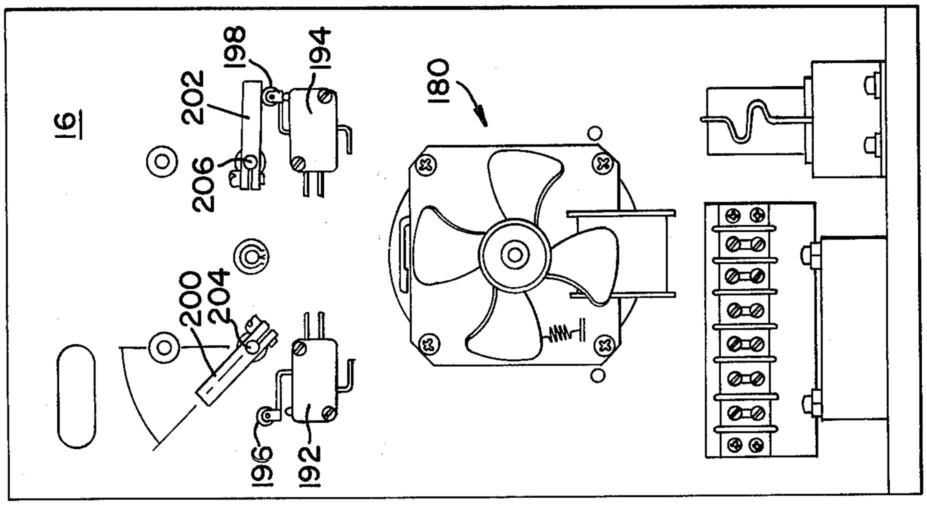
FIG. 3 is a rear elevational view of the pump assembly, showing operation of certain control elements of the apparatus.

Referring now to FIGS. 3 and 5, it is shown that the pump assembly 10 also includes, attached to the vertically extending frame wall 16, a motor assembly generally designated 180, shown to comprise a motor unit proper 182, a cooling fan 184, and a gear drive box or transmission 186 secured by fasteners 188 extending through the mounting flange 190 into the wall 16. The transmission 186 contains reduction gears of a type well known to those skilled in the art, and which therefore do not require detailed description for understanding. Located above the motor assembly 180 are a pair of microswitch bodies 192, 194 each having an actuating roller 196, 198 adapted to be engaged by a clevis mounted actuator arm 200, 202. Each of the respective arms is mounted on a shaft 204, 206, with these shafts being mounted so as to rotate with the valve drive gears 100, 102. Proper location of the actuator arms 200, 202, and the microswitches 192, and 194 may be accomplished so as to turn off or turn on the motor, or to actuate another component with which the pump is associated. In some cases the pump is associated in use with a turntable and a sequencing mechanism, and in other cases the pump is manually controlled. In either case it is sometimes desirable to stop the operation of the pump when one or both of the valves has achieved a certain position, and the microswitches and actuator arms are used for this purpose. FIG. 3 shows provisions for wiring such controls, but these will not be described in detail because they do not form a necessary part of the pump unit of the invention.

From the immediately foregoing description it will be apparent that as the motor rotates, the main drive wheel 70 will be rotated, and that this in turn will cause vertical reciprocation of the carriage assembly 24 including the syringe engaging yokes 57, 58. The wheel or crankshaft 70, acting through the cam lobe 78, will first move one and then the other of the valve drive links 80, 82, rotating the valve driving gear through a small arc and causing the valve driven gears 104, 106 to rotate through a larger arc and thus turn the spools 115 of the valves 112, 114.

Referring now to the entire operation of the apparatus pump unit shown in FIGS. 1–6 it will be assumed that the syringes 124 are filled with the desired liquids, that various lines 118–124 are full and that the ends of the inlet and outlet lines respectively are placed in association with their supply containers and analyzer receptacles into which the fluid is to be discharged. Assuming that the operator is aware of the precise volume of fluid he wishes to be dispensed through one or more of the following pump cycles, he indexes the turntable 164 so that the appropriate numerical indicator is positioned opposite the stationary mark 210 on the front of the lower cabinet 15; this is done for both turntables. The control switch 212 on the front of the upper cabinet 14 is energized and the armature of the motor 180 rotates, driving the main drive wheel 70 through the transmission or reducing gear drive 186. Inasmuch as there is a clearance space intentionally left between the end of the zeroing screw 40 and the lower surface of one of the metering rods 170, the entire carriage 24, including the lower cross member 36, will rise to a certain limited extent before engagement with the metering rod 170 is possible, and this is true even in the case of the metering rod of the greatest length. Therefore, initial rotation of the wheel 70 which moves the bearing 72 and the associated connecting rod 74 just above bottom dead center will not cause movement of the metering rods 170. However, such rotation does move the lobe 78 on the surface 76 of the wheel 70 an amount sufficient to cause the cam lobe 78 to engage the follower roller 88. This causes the left hand valve link to be driven to the left and causes the finger 92 to engage the roller 96 on the valve drive gear 100, rotating it counterclockwise. This causes a clockwise rotation of the gear 104, which causes the valve stem 108 to rotate clockwise one quarter turn. The valve stem end or spool is turned by the stem, within the valve body, as shown in FIG. 6. Clockwise rotation of the valve spool 115 through a 90° arc from the position shown in FIG. 6 would place the interior of the syringe 124 in registry with the outlet line 120 in the position shown in FIG. 6, creating a path of communication between the inlet line 118 and the interior of the syringe 124. Accordingly, the valve driven train serves to switch the valve between a first position permitting aspiration of the fluid from the fluid source into the body of the syringe, and subsequent movement of the valve permits an opposite movement of the valve plunger 155 to discharge the fluid contents of the syringe through the outlet line 120. From the configuration of the cam lobe and the accelerating action provided by the valve operated drive links 80, it will be seen that relatively little rotation of the main drive wheel 70 is required to achieve one quarter turn or 90° rotation of the valve spool 115. Inasmuch as the rotation of the wheel 70 which serves to reposition the valve spool 115 is carried out near bottom dead center of the rotational cycle of the wheel, the vertical movement of the carriage assembly 24 occurring during this time is relatively slight. After the valve stem has been positioned, as just explained, continued rotation serves to continue raising the carriage. Depending upon the length of the rod 170 which is held in the turntable 164 of the turret 26, the screws 46 in carriage cross member 36 will sooner or later engage the metering rods upon upward movement thereof. During this time, straight vertical movement of the carriage is assured by reason of engagement between the carriage guide rod 38 and the top guide 44, and between the rod 38 and the opening in the lower cross member 36 of the carriage. As the carriage assembly 24 continues its upward movement, the screw 46 and the guide rod 170 are driven as a unit, and after taking up slight additional slack between the rounded boss 160 beneath the plunger flange 156, the plunger stem 152 is moved vertically, thereby causing the plunger 155 to discharge the contents of the syringe through the outlet opening 120. After the bearing 72 and the associated connecting rod 74 reach a top dead center position, the carriage begins to descend, carrying downwardly with it the yokes 56, 58. In view of the fact that a clearance space was provided between the bosses 160, 162 and the top surfaces of the metering rods 170, however, downward movement of the yokes does not cause immediate engagement with the flanges 156, 158 on the syringe stems 152, 154, until the clearance space just described has been taken up. In other words, on the upstroke, initial upward movement of the carriage prior to engaging the metering rods 170 causes a corresponding separation between the lower surfaces of the yokes and the upper surfaces of the syringe flanges 156, 158. Accordingly, at the top of the stroke, there is a measureable space between the yoke and the flanges, and downward carriage movement during this time can occur before there is postive engagement between the yokes and the syringe flanges. During this time, the cam lobe 78 has reached the position shown in FIG. 4 where rotation just clockwise from top dead center of the connecting rod will cause the lobe 78 to engage the roller 90, moving the right hand valve link 82 to the right, which in turn causes engagement between the end portion 94 thereof and the roller 98. This clockwise movement of the roller 98 rotates the valve drive gear 102 clockwise rotating the valve stem drive gear 106 counterclockwise. This moves the valve stem 115 back to the position shown in FIG. 4 and establishes communication between the inlet line 118 and the interior of the syringe 124. As is the case with valve actuation near bottom dead center, valve actuation near top dead center occurs within a relatively few degrees rotation of the drive wheel 70. Continued downward movement of the carriage caused by further wheel rotation causes positive engagement with the lower surfaces of the yokes 56, 58 and their counterpart syringe flanges 156, 158. This withdraws the plungers 155, and the resulting suction fills the syringe with a charge of liquid which is proportional to the length of the metering rod 170. If the selected metering rod is long, engagement between the yokes and flanges occurs near the bottom and continues throughout the length of most of the vertical movement stroke of the carriage; if the metering rod is short, the metering rod is moved only as the carriage approaches the middle or upper portion of its stroke on the upstroke and is moved only towards the bottom on the downstroke. In either case, sufficient clearance is provided to insure that movement of the syringe plunger does not take place during valve rotation, thereby insuring highly accurate, repeatable operation of the system.

Referring now to FIG. 4, it will be appreciated that, during that part of the operating sequence in which the cam drives the left hand drive link 80 to rotate the gear 100, the valve idler gear 101 will rotate the other drive gear 102 in the same direction. Inasmuch as the gears 100, 102 thus rotate in the same direction the valve stem drive gears 104, 106 rotate in the same direction and both valve stems will rotate in the same direction. From FIG. 4 it will also be appreciated that operation of the left link 80 serves to move both valve stems as the carriage 24 leaves bottom dead center, whereas movement of the righthand valve operating lever or link 82 causes rotation of both valve stems as the downstroke is begun. In other words, each valve lever or link is operative to move both valve stems in one direction and the other serves to rotate both valve stems in the opposite direction, undergoing mere lost motion when not serving a valve moving function.

Referring now to an important feature of the invention, namely, the position of the turret assemblies 26, 28 which include the plurality of different length metering rods 170, this feature enables greatly improved operational precision, inasmuch as the length of each metering rod may be accurately determined by the factory at the time of manufacture. As shown, each turntable preferably contains ten or more rods. Each rod is of a different length, and the volume associated with the rod length may be marked on the machine, or determined by reference to a table used by the operator. When it is desired to determine the pump or "shot" size of each syringe, reference is made to the table and the turntable is rapidly indexed to the desired position. As shown in FIG. 1, both numbers one are set to appear in the window of the front face of the lower cabinet 15. Accordingly, a certain link will be indexed into position between one of the zeroing screws 46 and one of the bosses 160 or 162 at the bottom of each syringe stem flange 156, 158. The length of the metering rod will determine the length of the stroke of the syringe plunger on both the upward and downward stroke and accordingly will determine the volume displaced by each stroke of the pump.

Inasmuch as each turntable 26, 28 is independent of its counterpart assembly, the pump may be operated so as to dispense a certain volume from the right hand side, and a greater or less volume from the left hand syringe. Similarly, both turntables may be manipulated so as to discharge equal volume. According to the present invention it is possible to switch almost immediately from any given sample or specimen size to another other size, merely by indexing the turntable to the desired position.

In all cases, sufficient free play or lost motion is provided in the drive mechanism to insure that the plungers are not being moved while the valves are being turned. As pointed out above, it was common in the prior art, when switching from a desired shot or specimen size which was relatively small to one which was relatively large, for two or more metering screws to have to be manipulated, and the first being a coarse adjustment and the second being a fine or Vernier adjustment. This created the possibility of misreading in determining the size, and also created a problem of wasted time, especially when the screw threads in question were relatively fine. In keeping with the present invention, the stroke of the operating parts, including the arc through which the valve stems move and the vertical distance traveled by the carriage assembly remain constant. No adjustment needs to be made to any portion of the machine except for merely "dialing in" the desired length of stroke and hence controlling the volume desired for each stroke of each of the plungers.

Referring now to another feature of the invention, it is shown that it may be assumed that it may be desired from time to time to change syringes. In such case, it is only necessary to remove the face plate 140 by manipulating the thumb screw 142, and then release either or both of the syringe clamps 144 by manipulating the thumb screws 150. Thereupon, the body of the syringe may be rotated about its own axis to unscrew the threaded portion 128 thereof from the valve body. To replace the syringe, the above steps are performed in opposite order, namely, the threaded nose portion of the syringe is screwed into the valve body and the clamp 144 is moved into place so that the recess registers with the enlarged flange 126 at the base of the syringe. Tightening the thumb screw finishes locking the syringe in place at the bottom thereof. In the form of invention just described, two identical syringes 18, 20 are shown and described, two turrets 26, 28 are provided, and a single carriage 24 is used. It will be understood that the principles of the invention are equally applicable to variable capacity positive placement pumps using a single syringe or, on the other hand, to pumps using three or more syringes. The pump may be electrically wired so as to be adapted for use as an operative component part of a larger instrument; this would typically call for the pump to undergo a predetermined number of cycles or strokes before shutting off, or to be manually operable, a single cycle at a time. The manner of programming the machine in this way is well known to those skilled in the art, and does not form a part of the invention. However, the switch assemblies 192 and 194 and the actuators therefor 200, 202, are shown as being illustrative of the capability of the instrument to indicate a desired position of one or both of the valves, if this is deemed desirable for any reason.

One advantageous feature of the present invention is that the driving mechanism for the carriage is such that a plot of plunger movement versus time will reveal a generally sinusoidal wave form. Because the carriage is raised and lowered by a link attached to a rotary wheel, motion of the plunger, at least when a relatively long metering rod is used, begins slowly, accelerates evenly, then decelerates before reversing direction. This type of motion eliminates sudden impacts and hydraulic hammering within the system. For example, some prior art systems used solenoid-operated pumps or other mechanisms wherein the portion of the pump which displayed the liquid was suddenly started or stopped. Motions of these types are disadvantageous because they create unnecessary wear and noise, and because sudden pressure variations create adverse effects within the pump. In some cases, the accuracy of the pump may be adversely affected. The form of pump described in detail herein overcomes this disadvantage and such a pump has proven to operate smoothly, reliably and accurately in use.

It will thus be seen that the present invention provides a novel positive displacement pump having a number of advantages and characteristics, including those pointed out and others which are invented in the invention. A preferred embodiment of the invention having been described by way of example, it is contemplated that various other forms of the unit may be made which differ in detail from the form just described without departing from the spirit of the invention or the scope of the appended claims.

What is claimed is:

1. A positive displacement pump assembly for withdrawing precisely measured, selected quantities of liquids from a supply receptacle and transferring said selected quantities of liquid to analysis receptacles for said liquids, said pump assembly comprising, in combination, at least one liquid cylinder and reciprocably movable plunger assembly adapted for positive displacement of a quantity of liquid upon plunger movement, said quantity displaced being proportional to the length of movement of said plunger within said cylinder, a reciprocable carriage having a first carriage portion thereof adapted to engage a plunger drive unit disposed in the movement path of said first carriage portion and to move said plunger drive unit in a first direction during a portion of the movement of said carriage in said first direction, and a second carriage portion adapted to engage a part of said plunger and to move said plunger in a second direction during a portion of the movement of said carriage in said second direction, means communicating with the interior of said liquid cylinder enabling aspiration and discharge of liquid materials upon plunger movement, powered means for reciprocating said carriage along said movement path in said first and second directions, a plurality of plunger drive units having different lengths, and means for holding said plunger drive units so as to permit free but limited axial movement thereof upon engagement thereof by said first carriage portion, said means for holding said plunger drive units being mounted so as to permit selective indexing of said plunger drive units into a position within the movement path of said first carriage portion, whereby, upon reciprocation of said carriage, said plunger is driven in said first direction by said first carriage portion acting through said plunger drive unit, said plunger is driven in said second direction by engagement between a portion of said second carriage portion plunger, and whereby the quantity of liquid displaced by said plunger is determined by the length of plunger drive unit positioned within said carriage movement path.

2. A pump assembly as defined in claim 1 in which said means for holding said plunger drive units comprise a turntable having a plurality of cylindrical, axially extending openings disposed about the periphery thereof, said plunger drive units being in the form of metering rods received within said cylindrical openings and adapted for free but limited reciprocating axial movement within said openings.

3. A pump assembly as defined in claim 1 in which said second carriage portion includes a yoke member having an opening therein, and in which said plunger includes a stem and a flange on one end thereof, said yoke being adapted to engage said flange when said stem extends, in position of use, through said opening in said yoke.

4. A pump assembly as defined in claim 1 in which said powered means for reciprocating said carriage includes a motor, a rotary drive wheel driven thereby and a connecting rod, with one end of said connecting rod being attached to a portion of said carriage member, said carriage, said wheel and said connecting rod being constructed and arranged so that rotation of said wheel causes said carriage to be driven reciprocably by said connecting rod.

5. A pump assembly as defined in claim 1 which further includes a carriage guide assembly and in which said carriage includes means therein for slidably embracing said carriage guide to insure that said carriage movement path is a straight line path.

6. A pump assembly as defined in claim 1 in which said plunger assembly is arranged for vertical movement of said plunger, wherein said carriage is positioned for vertical reciprocation, wherein said plunger drive units are adapted for vertical reciprocating movement, and wherein said holding means for said plunger drive units includes a turret assembly having a vertical axis of rotation and a turntable portion adapted to rotate in a horizontal plane, said plunger drive units comprising rods having means at either end thereof to retain said rods for free but limited vertical movement with respect to said turntable.

7. A pump assembly as defined in claim 1 which further includes valve means associated with said cylinder and plunger assembly, said valve means being movable between a first position permitting flow from said cylinder into said analysis receptacle, and a second position permitting flow from a supply receptacle to said cylinder, said pump assembly further including means for positively driving said valve means between said first and second positions in response to movement of said means for reciprocating said carriage along said movement path, said valve train being constructed and arranged for movement only during these portions of carriage movement during which said first carriage portion is spaced from said plunger drive unit and when said plunger is free from engagement with said second carriage portion.

8. A pump assembly as defined in claim 1 which includes a pair of cylinder and pump assemblies.

9. A pump assembly as defined in claim 1 in which a pair of cylinder and plunger assemblies are provided, wherein said carriage is a single carriage, wherein said means for holding said plunger drive units comprises a pair of substantially identical turntables, each receiving a plurality of plunger drive units, said turntables, said cylinder and plunger assemblies and said carriage being arranged so that each turntable is adapted to position a single plunger drive unit beneath a counterpart and plunger unit in the path of said first carriage portion.

10. A pump assembly as defined in claim 7 wherein said means for driving said valve means includes a rotary cam operatively associated with said carriage drive, means for following said cam, said cam follower means including a lever mounted for arcuate movement and adapted to engage a valve drive, gear means, whereby carriage reciprocation causes movement of said cam follower and said lever, and lever movement causes movement of said valve means.

11. A positive displacement pump assembly for withdrawing precisely measured, selected quantities of liquids from a supply receptacle and transferring said selected quantities of liquid to analysis receptacles for said liquids, said pump assembly comprising, in combination, at least one liquid cylinder and reciprocably movable plunger assembly adapted for positive displacement of a quantity of liquid upon plunger movement, said quantity displaced being proportional to the length of movement of said plunger within said cylinder, valve means associated with said cylinder and plunger assembly, said valve means being movable between a first position establishing a path of liquid communication between said cylinder and a cylinder inlet line and a second position establishing communication between said cylinder and a cylinder outlet line, a reciprocable carriage having a first carriage portion thereof adapted to engage a plunger drive unit disposed in the movement path of said first carriage portion and to move said plunger drive unit in a first direction during a portion of the movement of said carriage in said first direction, a second carriage portion adapted to engage a part of said plunger and to move said plunger in a second direction during a portion of the movement of said carriage in said second direction, a plurality of plunger drive units having different lengths, means for holding said plunger drive units so as to permit free but limited axial movement thereof upon engagement thereof by said first carriage portion, said means for holding said plunger drive units being mounted so as to permit selective indexing of said plunger drive units into a position within the movement path of said first carriage portion, a powered common drive means for reciprocating said carriage along said movement path in said first and second directions, and for moving said valve means, between said first and second positions, said first and second carriage portions being spaced from each other by a fixed distance greater than the length of said plunger drive unit, whereby said plunger is positively engaged by said carriage portions during only one part of the reciprocating movement of said carriage, upon reciprocation of said carriage, said plunger is driven in said first direction by said first carriage portion acting through said plunger drive unit, said plunger is driven in said second direction by engagement between said second carriage portion and a part of said plunger, said drive means for moving said valve means being constructed and arranged so as to move said valve means between said first and second positions only during another part of the reciprocating movement of said carriage and the quantity of liquid displaced by said plunger is determined by the length of plunger drive unit positioned within said carriage movement path.

12. A positive displacement pump apparatus for aspirating and discharging liquid materials to be analyzed, said apparatus including at least one syringe assembly having a movable plunger unit, a reciprocable carriage, said carriage having means associated therewith for engaging a portion of said plunger, means for reciprocating said carriage under power, a syringe valve movable between at least first and second positions permitting, respectively, communication between said syringe interior and an intake line and between said syringe interior and a discharge line, means for moving said valve between said positions, means for controllably varying the effective length of the syringe stroke, said means including an assembly for selectively inserting separate stroke-length determining means between a portion of said carriage and a portion of said syringe plunger, and an operative drive connection between said means for reciprocating said carriage and said means for moving said valve between said first and second positions.

13. A positive displacement pump assembly for withdrawing precisely measured, selected quantities of liquid from a supply receptacle and for transferring said selected quantities of said liquid to analysis receptacles, said pump assembly comprising, in combination, a pump frame and a pair of plunger and cylinder assemblies secured to said frame, said plungers including a stem portion and a flange at the bottom thereof, means communicating with the interiors of said cylinders enabling aspiration and discharge of liquid materials upon movement of said plungers, a carriage assembly and cooperating means on said carriage assembly and said frame for guiding said carriage assembly for vertical reciprocating movement along a predetermined movement path, a lower cross bar on said carriage, a drive motor secured to said frame and including a main drive element and means for forming an operative connection between said drive element and a portion of said carriage, a pair of turret assemblies, each including a turntable adapted to rotate in a horizontal plane, each turntable including a plurality of plunger drive metering rods disposed therein and carried for free but limited vertical movement with respect to said turntable, said turntables being mounted with respect to said frame so as to have an outer margin thereof lying within the movement path of a portion of said carriage, a pair of yokes forming a part of said carriage and being spaced vertically from the lower cross bar portion thereof, said yokes being adapted, in position of use, to engage the upper edges of said plunger stem flanges, whereby, upon upward movement of said carriage, said carriage lower cross bar drives said plunger drive units so as to move said plungers upwardly, and upon downward movement of said carriage said yokes on said carriage drive said plungers downwardly.

14. A pump assembly as defined in claim 13 which further includes valve means associated with said cylinder and plunger assembly, said valve means being movable between a first position permitting flow from said cylinder into said analysis receptacle, and a second position permitting flow from a supply receptacle to said cylinder, said pump assembly further including means for positively driving said valve means between said first and second positions in response to movement of said means for reciprocating said carriage along said movement path, said valve train being constructed and arranged for movement only during these portions of carriage movement during which said carriage lower cross bar is spaced from said plunger drive unit and when said plunger is free from engagement with said yokes.

* * * * *